United States Patent
Tanaka

(10) Patent No.: US 9,701,162 B2
(45) Date of Patent: Jul. 11, 2017

(54) HEAVY DUTY TIRE

(71) Applicant: Sumitomo Rubber Industries, Ltd., Kobe-shi, Hyogo (JP)

(72) Inventor: Kaori Tanaka, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 562 days.

(21) Appl. No.: 14/199,388

(22) Filed: Mar. 6, 2014

(65) Prior Publication Data

US 2014/0326379 A1 Nov. 6, 2014

(30) Foreign Application Priority Data

May 2, 2013 (JP) ................................ 2013-097046

(51) Int. Cl.
 *B60C 11/13* (2006.01)
 *B60C 11/03* (2006.01)

(52) U.S. Cl.
 CPC ....... *B60C 11/0309* (2013.01); *B60C 11/0311* (2013.01); *B60C 11/0316* (2013.01); *B60C 11/1323* (2013.01); *B60C 11/1315* (2013.01); *B60C 2011/0346* (2013.01); *B60C 2200/06* (2013.01); *B60C 2200/065* (2013.01)

(58) Field of Classification Search
 CPC ............. B60C 11/0316; B60C 11/0311; B60C 11/0309; B60C 11/0306; B60C 11/1323; B60C 11/1315; B60C 2011/0346; B60C 2200/06; B60C 2200/065
 See application file for complete search history.

(56) References Cited

U.S. PATENT DOCUMENTS

| 5,591,280 A | * | 1/1997 | Asano | B60C 11/0302 |
| | | | | 152/209.22 |
| 2008/0078488 A1 | * | 4/2008 | Yoda | B60C 11/0311 |
| | | | | 152/209.26 |
| 2011/0088821 A1 | * | 4/2011 | Imakita | B60C 11/1315 |
| | | | | 152/209.15 |

FOREIGN PATENT DOCUMENTS

| JP | 07-081323 | * 3/1995 | ............ B60C 11/04 |
| JP | 2001-315507 A | 11/2001 | |

OTHER PUBLICATIONS

Machine translation of JP07-081323 (no date).*
Extended European Search Report for European Application No. 14155935.1, dated Aug. 8, 2014.

* cited by examiner

*Primary Examiner* — Michael H Wilson
*Assistant Examiner* — Philip N Schwartz
(74) *Attorney, Agent, or Firm* — Birch, Stewart, Kolasch & Birch, LLP

(57) ABSTRACT

A heavy duty tire includes a tread portion provided with a pair of circumferential main grooves including at least one zigzag groove, lateral grooves extending between the main grooves to form center blocks therebetween, and lug grooves. Each lug groove includes an axially inner portion connecting to the zigzag groove while curving toward a first circumferential direction of the tire. The lug groove has a first groove edge disposed on a side of the first circumferential direction and a second groove edge facing against the first groove edge. The first groove edge is connected to an axially outer groove edge of the zigzag groove. The second groove edge is connected to an axially inner groove edge of the zigzag groove. The lug groove includes a constant groove width, and a groove-bottom width smoothly decreasing axially inward from the tread edge.

7 Claims, 6 Drawing Sheets

HEAVY DUTY TIRE

BACKGROUND OF THE INVENTION

Field of the Invention

The present invention relates to a heavy duty tire that may exhibit better performance with respect to wet grip, stone-biting resistance, and wear resistance.

Description of the Related Art

These days, heavy duty tires are requested to have better performance with respect to wet grip, stone biting resistance, and wear resistance. Under the circumstances, Japanese Unexamined Patent application Publication No. 2001-315507 discloses a heavy duty pneumatic tire including a tread portion having a lug pattern.

However, since the tire disclosed in the publication above has no lateral groove in a central region of the tread portion, it may exhibit poor performance with respect to wet grip. Furthermore, since the tread portion is provided with a plurality of straightly extending lug grooves, a stone may easily be held by three groove walls at a groove-junction of the main groove and the lug groove, and then it may remain therein in the long term.

SUMMARY OF THE INVENTION

The present invention has been worked out in light of the circumstances described above, and has a main object of providing a heavy duty pneumatic tire that may exhibit better performance with respect to wet grip, stone-biting resistance, and wear resistance.

According to one aspect of the present invention, a heavy duty tire includes a tread portion provided with a pair of circumferentially and continuously extending main grooves disposed on both sides of a tire equator, a plurality of lateral grooves extending between the main grooves to form a plurality of center blocks therebetween, and a plurality of lug grooves. The main grooves comprise at least one zigzag groove that comprises a plurality of axially outer zigzag corners, a plurality of axially inner zigzag corners, and a plurality of inclined elements each connecting between the axially outer corner and the axially inner corner. The center block has a five or more sided polygon shape on its top surface with at least one corner being formed of the axially outer zigzag corner of the zigzag groove. Each lug groove extends between a tread edge and the zigzag groove. The lug groove comprises an axially outer portion extending axially inward from the tread edge, and an axially inner portion connecting between the axially outer portion and the zigzag groove while curving toward a first circumferential direction of the tire. The lug groove has a first groove edge disposed on a side of the first circumferential direction with respect to its groove centerline and a second groove edge facing against the first groove edge. The first groove edge of the lug groove is connected to an axially outer groove edge of the zigzag groove, and the second groove edge of the lug groove is connected to an axially inner groove edge of the zigzag groove through the corner of the center block. The lug groove comprises a constant groove width at a top surface of the tread portion, and a groove-bottom width smoothly decreasing axially inward from the tread edge.

In another aspect of the present invention, the lug groove may have an angle α at the tread edge in a range of from 65 to 100 degrees with respect to a circumferential line that extends from the lug groove toward the first circumferential direction.

In another aspect of the present invention, the lug groove has a ratio WLa/WLb of a groove-bottom width WLa at the tread edge to a groove-bottom width WLb at the axially outer zigzag corner, and the ratio WLa/WLb may be set in a range of from 1.4 to 3.0.

In another aspect of the present invention, the lug groove has a pair of groove walls, each groove wall may have an angle βa at the tread edge in a range of from 8 to 25 degrees with respect to a line perpendicular to a top surface of the tread portion, each groove wall may have an angle βb at the axially outer zigzag corner in a range of from 15 to 30 degrees with respect to the line, and the angle βb may be greater than the angle βa.

In another aspect of the present invention, the lug groove may have a groove depth larger than that of the zigzag groove.

In another aspect of the present invention, both main grooves may be formed as the zigzag grooves, and the lug grooves may be disposed on both sides of the tire equator.

In another aspect of the present invention, the center block may have a six-sided polygon shape.

DETAILED DESCRIPTION

An embodiment of the present invention will be explained below with reference to the accompanying drawings.

Figure 1:
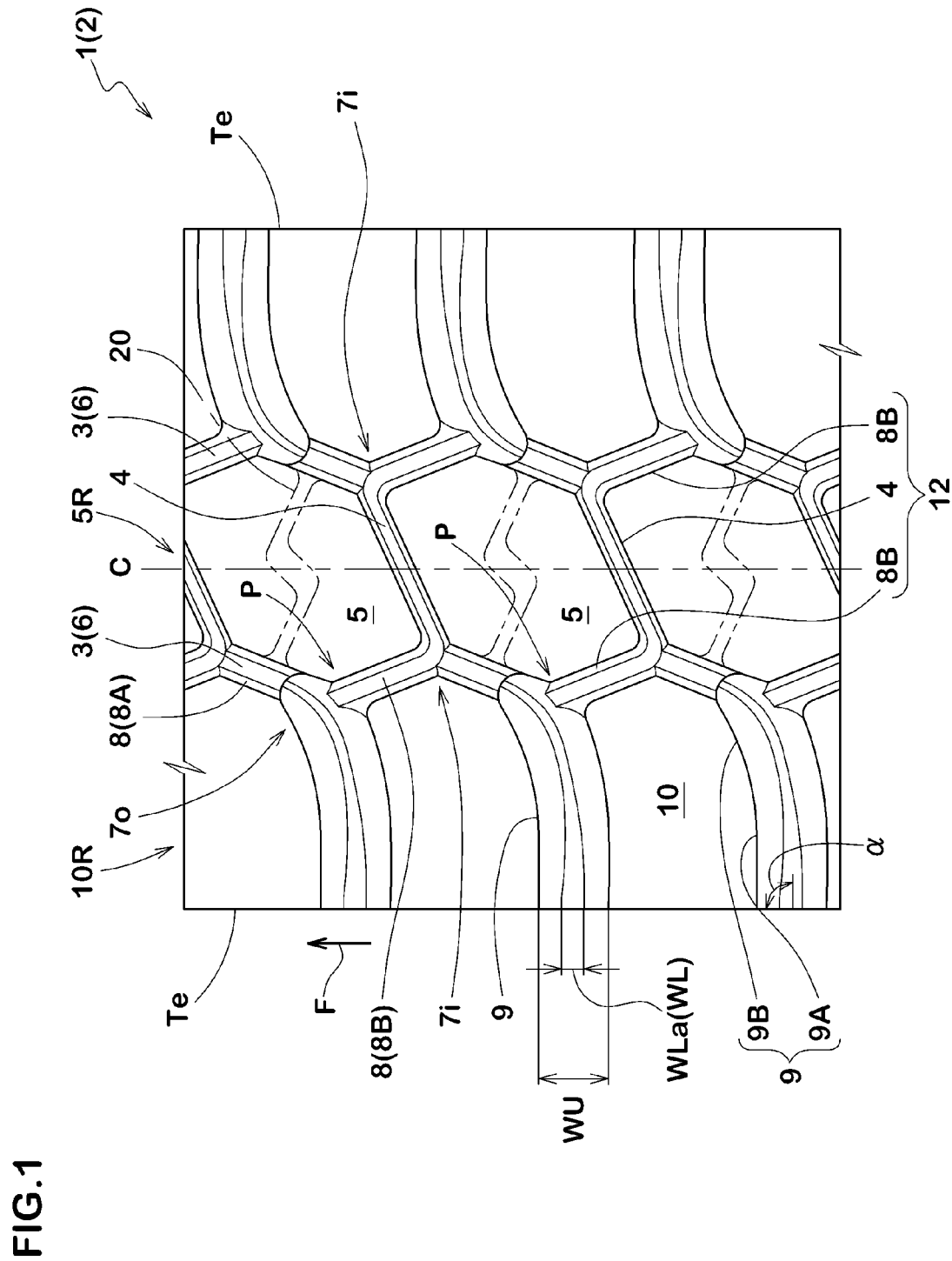
FIG. 1 is a development view illustrating a tread portion of a heavy duty tire in accordance with an embodiment of the present invention.

As shown in FIG. 1, a heavy duty tire 1 in accordance with the present embodiment includes a tread portion 2 being provided with a circumferentially and continuously extending main grooves 3 and 3 disposed on both sides of a tire equator C, a plurality of lateral grooves 4 extending between the main grooves 3 and 3 to form a plurality of center blocks 5 therebetween. Thus, the tread portion 2 includes a block row 5R on its central region.

The main grooves 3 include at least one zigzag groove 6 that includes a plurality of axially outer zigzag corners 7o, a plurality of axially inner zigzag corners 7i, and a plurality of inclined elements 8 each connecting between the axially outer corner 7o and the axially inner corner 7i. Thus, each center block 5 has a five or more sided polygon shape on its top surface with at least one corner P being formed of the axially outer corner 7o of the zigzag groove 6.

In this embodiment, both main grooves 3 and 3 are formed as the zigzag grooves 6, and each lateral groove 4 straightly extends so as to connect the axially inner zigzag corner 7i of one zigzag groove 6 and the axially inner zigzag corner 7i of the other zigzag grooves 6. Thus, the center block 5 has a six-sided polygon shape (a hexagonal shape) on its top surface in this embodiment. Alternatively, the top surface of the center block 5 may have a seven of more sided polygon shape when the lateral groove 4 is a bent groove.

Furthermore, the top surface of the center block 5 may have a five-sided polygon shape when the one of the main groove 3 extends in a straight manner in the circumferential direction of the tire. Furthermore, the center block 5 may be provided with a groove 20 for suitably adjusting its rigidity. Preferably, the groove 20 has its groove depth of about 50% or less in relation to a groove depth of the main groove 3 or lateral groove 4.

The tread portion 2 is further provided with a plurality of lug grooves 9 each extending between the tread edge Te and the zigzag groove 6. Thus, the shoulder region between the tread edge Te and the zigzag groove 6 is formed as a shoulder block row 10R that includes a plurality of shoulder blocks 10 arranged in the circumferential direction of the tire.

Each lug groove 9 includes an axially outer portion 9A extending axially inward from the tread edge Te in a straight manner, and an axially inner portion 9B connecting between the outer portion 9A and the zigzag groove 6 while curving in an arc manner toward a first circumferential direction F of the tire. Preferably, the lug groove 9 has an angle α at the tread edge Te in a range of from 65 to 100 degrees, more preferably in a range of from 85 to 95 degrees, with respect to a circumferential line that extends from the lug groove 9 toward the first circumferential direction F.

Figure 2:
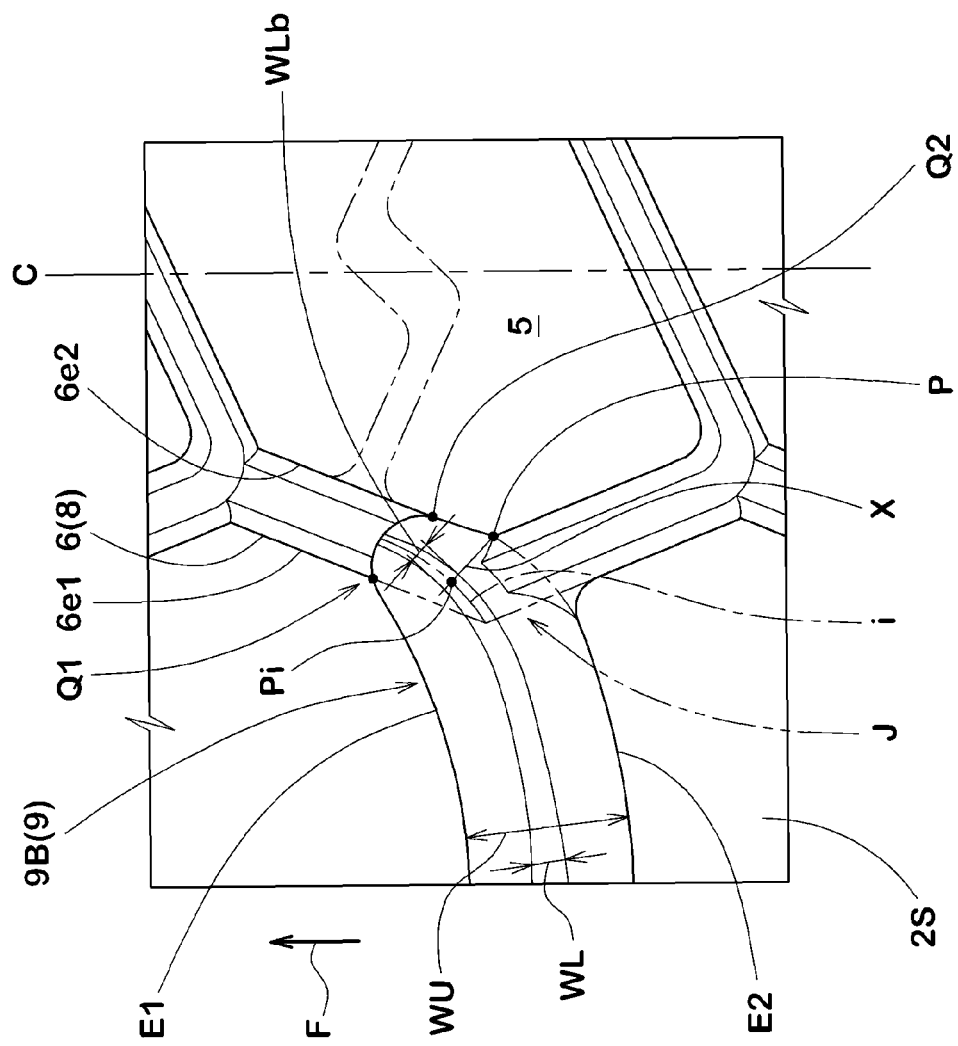
FIG. 2 is a partial enlarged view of a lug groove of FIG. 1.
Figure 3:
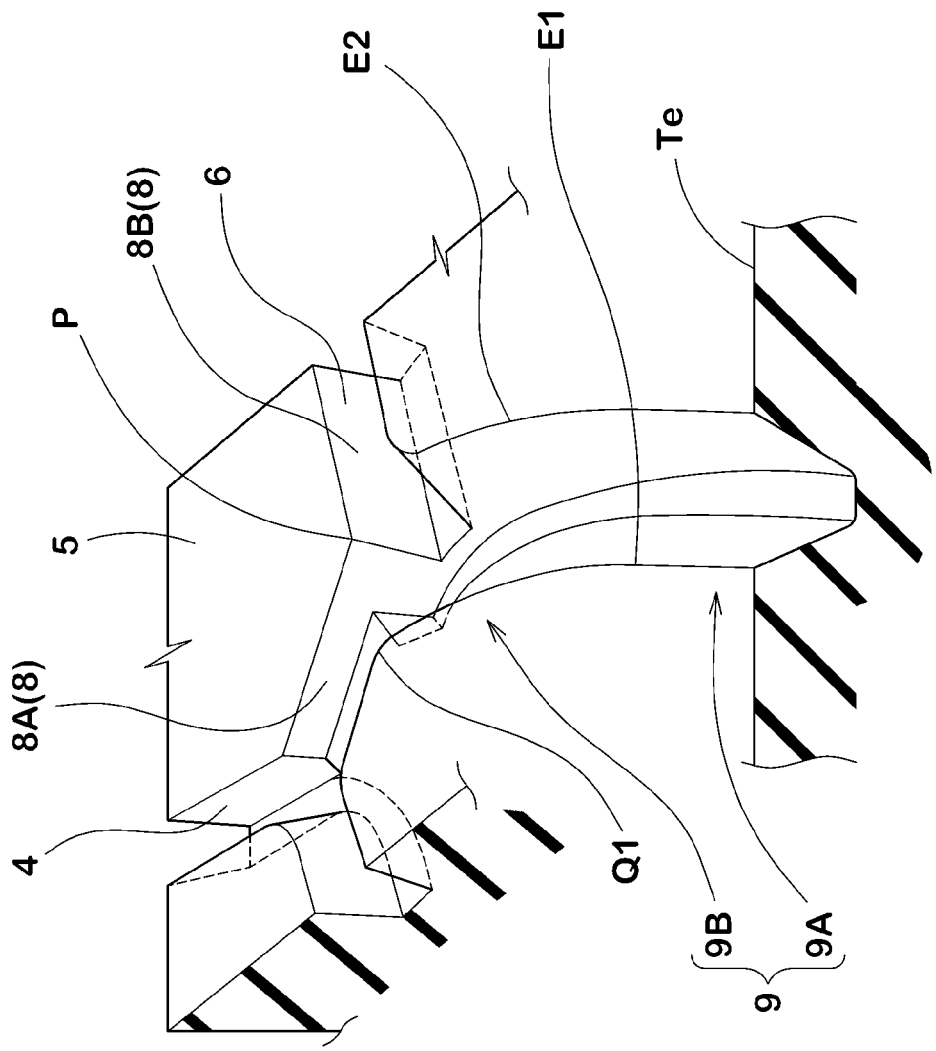
FIG. 3 is a perspective view of the lug groove.

As shown in FIG. 2 and FIG. 3, the lug groove 9 has a first groove edge E1 disposed on a side of the first circumferential direction F with respect to its groove centerline, and a second groove edge E2 facing against the first groove edge E1. The first groove edge E1 of the lug groove 9 is connected to an axially outer groove edge 6e1 of the zigzag groove 6 at an intersection point Q1. The second groove edge E2 of the lug groove 9 is connected to an axially inner groove edge 6e2 of the zigzag groove 6 at an intersection point Q2 through the corner P of the center block 5. Namely, a part of the lug groove 9 extends so as to overlap on the zigzag groove 6. Here, the lug groove 9 has its groove depth H9 (shown in FIGS. 4A and 4B) greater than a groove depth H6 (shown in FIGS. 5A and 5B) of the zigzag groove 6. Thus, the lug groove 9 may be distinguished from the zigzag groove 6 clearly, even in an overlapped portion J between the lug groove 9 and the zigzag groove 6.

The axially inner portion 9B of the lug groove 9 extends in a single arc manner, or a multiple arc manner that includes a plurality of arcs having different radii of curvature. When the axially inner portion 9B of the lug groove 9 extends in the multiple arc manner, the arcs are arranged so that these radii of curvatures are decreasing toward the zigzag groove 6.

The lug groove 9 comprises a constant groove width WU at the top surface 2S of the tread portion 2 except for the overlapped portion J. On the other hand, a groove-bottom width WL of the lug groove 9 smoothly decreases axially inward from the tread edge Te.

Figure 4A:
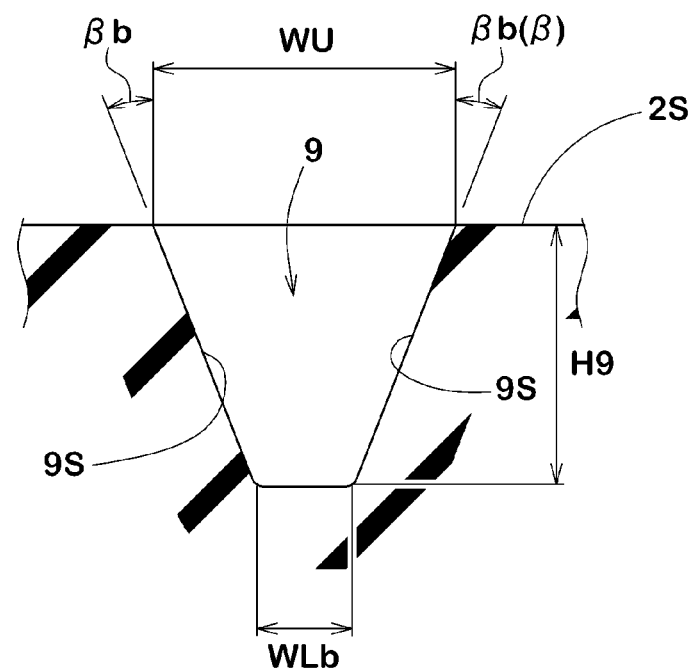
FIG. 4A is a cross-sectional view of the lug groove at an axially outer zigzag corner of a zigzag groove.

Preferably, the lug groove 9 has a ratio WLa/WLb in a range of from 1.4 to 3.0, more preferably in a range of from 1.5 to 2.0, where "WLa" is the groove-bottom width of the lug groove 9 at the tread edge Te (shown in FIGS. 1 and 4B), and "WLb" is the groove-bottom width of the lug groove 9 at the corner P (shown in FIGS. 2 and 4A). Here, the groove-bottom width WLb of the lug groove 9 at the corner P is measured on a plane X extending from the corner P perpendicular to a groove bottom centerline (i) of the lug groove 9. In FIG. 2, the reference characters "Pi" shows an intersection of the plane X and the groove bottom centerline (i) of the lug groove 9.

Figure 4B:
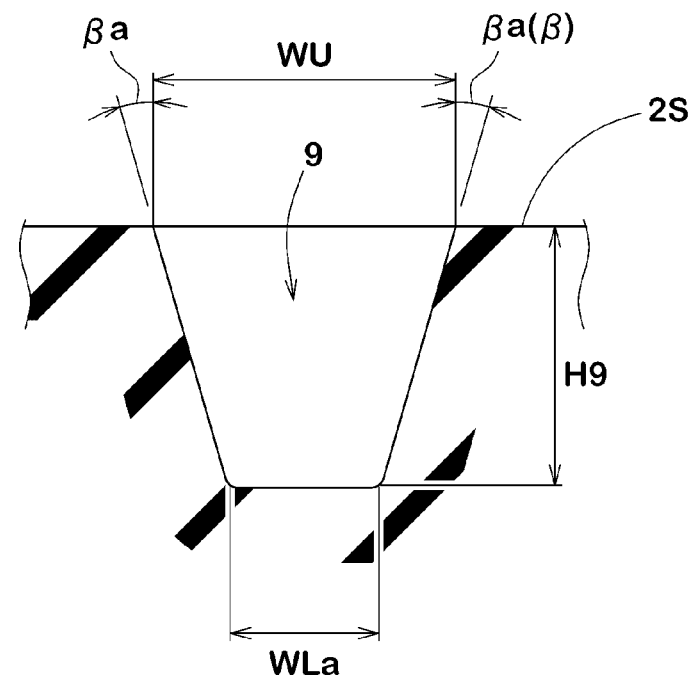
FIG. 4B is a cross-sectional view of the lug groove at a tread edge.

As shown in FIGS. 4A and 4B, the lug groove 9 further comprises a pair of groove walls 9S and 9S, and the respective angles β with respect to a normal perpendicular to the top surface 2S of the tread portion are substantially same. Preferably, angles βa of the groove walls 9S at the tread edge Te are set in a range of from 8 to 25 degrees with respect to the normal perpendicular to a top surface 2S of the tread portion. Preferably, angles βb of the groove walls 9S at the corner P are set in a range of from 15 to 30 degrees with respect to the normal perpendicular to the top surface 2S of the tread portion. More preferably, the angles βb are set greater than the angles βa. Here, angles βb of the groove walls 9S at the corner P are measured on the plane X.

Firstly, since the tire 1 in accordance with the present invention comprises a plurality of center blocks 5 on its central region of the tread portion 2 where large ground contact pressure tends to be acted, large traction may be generated while maintaining wet grip performance.

Secondly, since the cross-sectional area of each lug groove 9 increases toward the tread edge Te along with its groove-bottom width WL, it may effectively remove the water from under the tread portion 2 so that wet grip performance may further be improved. Thirdly, since each lug groove 9 has a constant groove width WU at the top surface 2S of the tread portion 2, the difference in rigidity within each shoulder block 10 is reduced so that the shoulder block 10 may exhibit high wear resistance. When the groove-bottom width ratio WLa/WLb is less than 1.4, it might be difficult to drain much water out from the tread edge Te through the lug grooves 9. On the other hand, when the groove-bottom width ratio WLa/WLb is more than 3.0, it might be difficult to improve wet grip performance due to excessively small groove-bottom width WL, or be difficult to improve wear resistance due to excessively large groove-bottom width WL.

Figure 6:
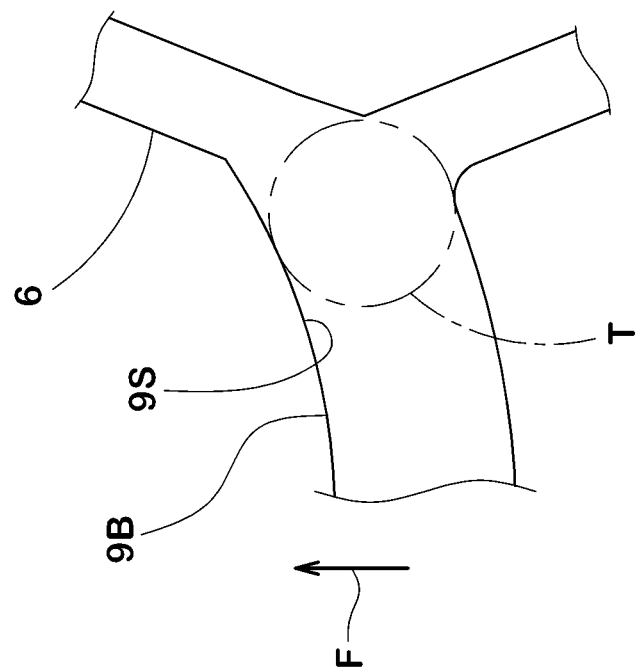
FIG. 6 is a plan view of a groove junction holding a stone.

Furthermore, the lug groove 9 includes the axially inner portion 9B connected to the zigzag groove 6 while curving in an arc manner. As shown in FIG. 6, when a stone T is bitten into a groove junction of the zigzag groove 6 and the axially inner portion 9B of the lug groove 9, the groove wall 9S of the axially inner portion 9B disposed on the side of the first circumferential direction F may contact with the stone T in line contact or surface contact so as to reduce its contact pressure for holding the stone T. Furthermore, since the axially inner portion 9B of the lug groove 9 is formed as an arc manner, the stone T held in the axially inner portion 9B tends to move easily during traveling. Thus, the tire 1 in accordance with the present embodiment offers a groove configuration that may easily push the stone away from the lug groove 9, thereby improving stone-biting resistance. Furthermore, the axially inner portion 9B of the lug groove 9 may smoothly drain the water toward the tread edge Te, thereby further improving wet grip performance of the tire.

When the angle α of the lug groove 9 at the tread edge Te is less than 65 degrees, an excessive acute angled corner portion with low rigidity may be formed on the shoulder block 10 between the tread edge Te and the lug groove 9, where uneven wear tends to be generated. On the other hand, when the angle α of the lug groove 9 at the tread edge Te is more than 100 degrees, it might be difficult to smoothly drain the water.

When the groove wall angle βa of the lug groove 9 at the tread edge Te is less than 8 degrees, the lug groove 9 might be difficult to push the bitten stone out from there. Furthermore, since the difference between the angle βa and the angle βb is excessively small, poor wet grip performance may be offered. On the other hand, when the groove wall angle βa of the lug groove 9 at the tread edge Te is more than 25 degrees, the tread portion 2 may have a relatively small land ratio with low wear resistance. When the groove wall angle βb of the lug groove 9 at the corner P is less than 15 degrees, the lug groove 9 might be difficult to push the bitten stone out from there. When the groove wall angle βb of the lug groove 9 at the corner P is more than 30 degrees, the tread portion 2 may have a relatively small land ratio with low wear resistance. Furthermore, since the difference between the angle βa and the angle βb is excessively small, poor wet grip performance may be offered.

Figure 5A:
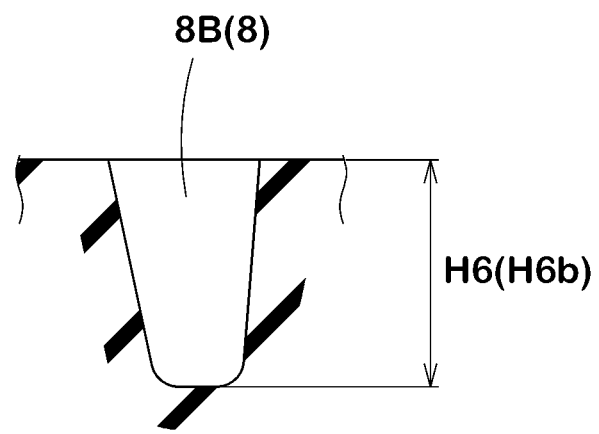
FIGS. 5A and 5B are cross-sectional views of the zigzag grooves.
Figure 5B:
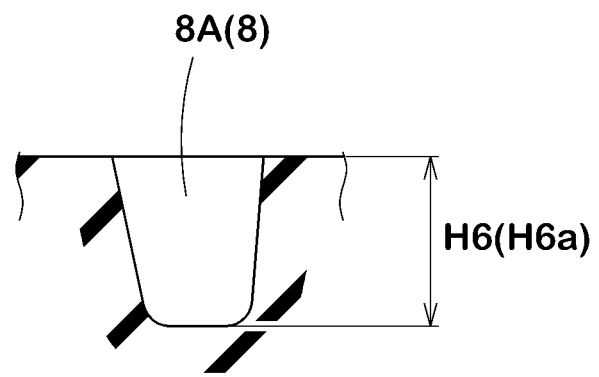

As shown in FIGS. 5A and 5B, the inclined elements 8 include a first inclined element 8A extending toward the first circumferential direction F from the axially outer zigzag corner 7o, and a second inclined element 8B extending toward the opposite direction with respect to the first circumferential direction F from the axially outer zigzag corner 7o. In this embodiment, the first inclined element 8A has a groove depth H6a, and the second inclined element 8B has a groove depth H6b larger than the groove depth H6a of the first inclined element 8A. Thus, stone-biting resistance at the junction of the zigzag groove 6 and the lateral groove 4 may further be improved.

Furthermore, the groove depth H6b of the second inclined element 8B is preferably set same as a groove depth H4 (not shown) of the lateral groove 4. Thus, as shown in FIG. 1, a pair of second inclined elements 8B and one lateral groove 4 arranged therebetween may form an N-shaped groove configuration 12 with a constant groove depth. Such an N-shaped groove configuration 12 may offer better drainage performance by communicating a pair of lug grooves 9 arranged both sides of the tire equator C.

While the particularly preferable embodiments of the present invention have been described in detail, the present invention in not limited to the illustrated embodiments, but can be modified and carried out in various aspects.

Comparison Test

To confirm the advantage of the present invention, the heavy duty tires (325/95R24) shown in FIG. 1 and Table 1 were manufactured and tested with respect to wet grip, stone-biting resistance, wear resistance, and uneven wear resistance. The reference tires (Ref. 1 to 3) having straightly extending lug grooves without curved axially inner portion were also manufactured in comparison.

The difference between tires of Ref. 1 and Ex. 1 is only that the lug groove of Ref. 1 is not provided with the curved second portion. The tires of Ref. 2 and Ref. 3 also differ from the tire of Ex. 1 in that they have groove widths of the lug grooves at the top surface of the tread portion decreasing axially inward from the tread edge, same as its groove-bottom width. The details of test tires and test methods are as follows.

Details of Test Tires:
  Zigzag groove depth H6a: 13.5 mm
  Zigzag groove depth H6b: 18.0 mm
  Lateral groove depth H4: 18.0 mm (1) Wet Grip Performance Test:

The test tires worn to 75% were installed in a 2-D truck with a half load to its carrying capacity 10 tons, as its whole wheels using the rim of 24×8.50 and the internal pressure of 850 kPa. Then, a test driver suddenly started the truck using the second gear position by engaging its clutch at the timing of a 1,500 rpm engine speed on a wet asphalt road with a puddle 5 mm deep, and measured the time for traveling to 10 m distance. The test results were evaluated as the reciprocal of the time and were indicated using an index based on Ex.1 being 100 in Table 1. The larger the index, the better the wet performance is.

(2) Stone-Biting Resistance Test

The test tire of Ex. 1 was installed in the truck above as its one of the rear wheels, and the other one of the rear wheels was installed the test tire using the same rim and internal pressure above. Then, the test driver drove the truck until when any one of rear tire worn to 50%. The test results were evaluated as the reciprocal of the number of stones held in the tread grooves of the tire, and were indicated using an index based on Ex. 1 being 100 in Table 1. The larger the index, the better the stone-biting resistance is.

(3) Wear Resistance Test:

After the stone-biting test, the amount of groove depth left of each test tire was measured. The test results were evaluated as the reciprocal of the number of the amount of groove depth left, and were indicated using an index based on Ex. 1 being 100 in Table 1. The larger the index, the better the wear resistance is.

(4) Uneven Wear Resistance Test:

After the stone-biting test, the amount of heel and toe wear on the shoulder blocks was measured.

TABLE 1

| Lug groove specification | Ref. 1 | Ref. 2 | Ref. 3 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|---|
| Curved axially inner portion | Absence | Absence | Absence | Presence | Presence | Presence | Presence | Presence | Presence | Presence | Presence | Presence |
| Groove angle α (deg.) | 90 | 90 | 90 | 90 | 65 | 100 | 50 | 120 | 90 | 90 | 90 | 90 |
| Groove width WU (mm) | 26 | Non-constant | Non-Constant | 26 | 26 | 26 | 26 | 26 | Constant | Constant | Constant | Constant |
| Groove depth H9 (mm) | 21.6 | 21.6 | 21.6 | 21.6 | 21.6 | 21.6 | 21.6 | 21.6 | 21.6 | 21.6 | 21.6 | 21.6 |
| Ratio WLa/WLb | 1.6 | 1 | 1 | 1.6 | 1.6 | 1.6 | 1.6 | 1.6 | 1.4 | 3 | 1 | 5 |
| Groove wall angle βb (deg.) | 22 | 19.5 | 22 | 22 | 22 | 22 | 22 | 22 | 22 | 22 | 22 | 22 |
| Groove wall angle βa (deg.) | 17 | 19.5 | 17 | 17 | 17 | 17 | 17 | 17 | 17 | 17 | 17 | 17 |
| Wet grip performance (Index) | 85 | 65 | 65 | 100 | 100 | 95 | 100 | 83 | 85 | 110 | 80 | 120 |
| Stone-biting resistance (Index) | 65 | 65 | 85 | 100 | 100 | 100 | 95 | 95 | 100 | 100 | 100 | 100 |
| Wear resistance (Index) | 100 | 100 | 95 | 100 | 100 | 100 | 90 | 90 | 100 | 85 | 100 | 80 |
| Amount of heel and Toe wear (mm) | 0.3 | 0.5 | 1 | 0.3 | 1.8 | 1.8 | 2.5 | 2.8 | 0.5 | 0.5 | 0.5 | 0.5 |

| Lug groove specification | Ex. 10 | Ex. 11 | Ex. 12 | Ex. 13 | Ex. 14 | Ex. 15 | Ex. 16 | Ex. 17 |
|---|---|---|---|---|---|---|---|---|
| Curved axially inner portion | Presence | Presence | Presence | Presence | Presence | Presence | Presence | Presence |
| Groove angle α (deg.) | 90 | 90 | 90 | 90 | 90 | 90 | 90 | 90 |
| Groove width WU (mm) | Constant | Constant | Constant | Constant | Constant | Constant | Constant | Constant |
| Groove depth H9 (mm) | 21.6 | 21.6 | 21.6 | 21.6 | 21.6 | 21.6 | 21.6 | 21.6 |
| Ratio WLa/WLb | 1.6 | 1.6 | 1.6 | 1.6 | 1.6 | 1.6 | 1.6 | 1.6 |
| Groove wall angle βb (deg.) | 15 | 30 | 13 | 40 | 22 | 30 | 22 | 30 |

TABLE 1-continued

| | | | | | | | | |
|---|---|---|---|---|---|---|---|---|
| Groove wall angle βa (deg.) | 10 | 17 | 8 | 17 | 8 | 25 | 5 | 28 |
| Wet grip performance (Index) | 95 | 110 | 83 | 120 | 98 | 85 | 95 | 80 |
| Stone-biting resistance (Index) | 85 | 110 | 78 | 120 | 85 | 110 | 80 | 120 |
| Wear resistance (Index) | 100 | 85 | 100 | 78 | 100 | 95 | 100 | 80 |
| Amount of heel and Toe wear (mm) | 1.5 | 1 | 1.6 | 1 | 1.6 | 1.2 | 1.8 | 1.5 |

What is claimed is:

1. A heavy duty tire comprising:
a tread portion provided with a pair of circumferentially and continuously extending main grooves disposed on both sides of a tire equator, a plurality of lateral grooves extending between the main grooves to form a plurality of center blocks therebetween, and a plurality of lug grooves;
the main grooves comprising at least one zigzag groove that comprises a plurality of axially outer zigzag corners, a plurality of axially inner zigzag corners, and a plurality of inclined elements each connecting between circumferentially adjacent axially inner and outer corners, the inclined elements comprising a first inclined element extending toward a first circumferential direction from each axially outer zigzag corner and a second inclined element extending toward an opposite direction with respect to the first circumferential direction from each axially outer zigzag corner, wherein the first inclined element has a groove depth which is at least partially smaller than that of the second inclined element; each of the center blocks having a five or more sided polygon shape on its top surface with at least one corner being formed of one of the axially outer zigzag corner of the zigzag groove;
each of the lug grooves extending between a tread edge and the zigzag groove, the lug groove comprising an axially outer portion extending axially inward from the tread edge and an axially inner portion connecting the axially outer portion and the zigzag groove while curving toward the first circumferential direction of the tire, the lug groove having a first groove edge disposed on a side of the first circumferential direction with respect to its groove centerline and a second groove edge facing against the first groove edge;
the first groove edge of the lug groove connected to an axially outer groove edge of the zigzag groove, the second groove edge of the lug groove connected to an axially inner groove edge of the zigzag groove through the corner of the center block; and
the lug groove comprising a constant groove width at a top surface of the tread portion, and a groove-bottom width smoothly decreasing axially inward from the tread edge,
wherein each of the lug grooves has a groove depth greater than the groove depths of the first and second inclined elements, and one of the lug grooves is connected to the first inclined element in such a manner that a deep bottom portion having a groove depth greater than the groove depth of the second inclined element is provided in the first inclined element.

2. The heavy duty tire according to claim 1, wherein each of the lug grooves has an angle a at the tread edge in a range of from 65 to 100 degrees with respect to a circumferential line that extends from the lug groove toward the first circumferential direction.

3. The heavy duty tire according to claim 1, wherein each of the lug grooves has a ratio WLa/WLb of a groove-bottom width WLa at the tread edge to a groove-bottom width WLb at the axially outer zigzag corner, and
the ratio WLa/WLb is set in a range of from 1.4 to 3.0.

4. The heavy duty tire according to claim 1, wherein each of the lug grooves has a pair of groove walls,
each of the groove walls has an angle βa at the tread edge in a range of from 8 to 25 degrees with respect to a line perpendicular to a top surface of the tread portion,
each of the groove walls has an angle βb at the axially outer zigzag corner in a range of from 15 to 30 degrees with respect to the line, and
the angle βb is greater than the angle βa.

5. The heavy duty tire according to claim 1, wherein each of the lug grooves has a groove depth larger than that of the zigzag groove.

6. The heavy duty tire according to claim 1, wherein each of the main grooves is configured as the zigzag groove, and
the lug grooves are disposed on both sides of the tire equator.

7. The heavy duty tire according to claim 1, wherein each of the center blocks has a six-sided polygon shape.

* * * * *